(12) United States Patent
Overholser

(10) Patent No.: US 10,794,205 B2
(45) Date of Patent: Oct. 6, 2020

(54) CERAMIC SEAL COMPONENT FOR GAS TURBINE ENGINE AND PROCESS OF MAKING THE SAME

(71) Applicant: Rolls-Royce North American Technologies Inc., Indianapolis, IN (US)

(72) Inventor: Ronald Walter Overholser, Carmel, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 524 days.

(21) Appl. No.: 15/443,715

(22) Filed: Feb. 27, 2017

(65) Prior Publication Data
US 2018/0266261 A1    Sep. 20, 2018

(51) Int. Cl.
*C04B 35/80* (2006.01)
*B32B 18/00* (2006.01)
(Continued)

(52) U.S. Cl.
CPC ............ *F01D 11/005* (2013.01); *B32B 18/00* (2013.01); *C04B 35/565* (2013.01); *C04B 35/80* (2013.01); *C04B 35/803* (2013.01); *F02C 7/28* (2013.01); *F02K 1/805* (2013.01); *F16J 15/3288* (2013.01); *C04B 2235/38* (2013.01); *C04B 2235/5244* (2013.01); *C04B 2235/612* (2013.01); *C04B 2235/616* (2013.01);
(Continued)

(58) Field of Classification Search
CPC ..... C04B 35/80; F01D 11/005; F01J 15/3288; F02C 7/28; F02K 1/805; F05D 2240/56
See application file for complete search history.

(56) References Cited

U.S. PATENT DOCUMENTS 5,076,590 A    12/1991    Steinetz et al.
5,318,309 A    6/1994    Tseng et al.
(Continued)

FOREIGN PATENT DOCUMENTS

EP    2 878 863 A1    6/2015
GB    2 390 569    1/2004
WO    WO 2014/130147 A1    8/2014

OTHER PUBLICATIONS

Extended European Search Report, dated Apr. 19, 2018, pp. 1-7, issued in European Patent Application No. 18153944.6, European Patent Office, Munich, Germany.

*Primary Examiner* — Erin Snelting
(74) *Attorney, Agent, or Firm* — Brinks Gilson & Lione

(57) ABSTRACT

A ceramic brush seal for a gas turbine engine, and a process for manufacturing the seal are provided. In one example, the process includes deinfiltrating an edge of a plurality of plies having a preimpregnated configuration. The edge is defined by a plurality of ceramic fibers extending away from a portion edge of a matrix infiltrated portion of each of the plies. In another example, the process includes masking an edge of a plurality of plies, the edge being defined by a plurality of ceramic fibers extending away from a portion edge of a body portion of each of the plies, and infiltrating the body portion of the plurality of plies with a ceramic matrix slurry. The plies are stacked, formed into a green body and then fired to form the component. The plies may include oxide/oxide woven ceramic fiber plies.

11 Claims, 8 Drawing Sheets

(51) Int. Cl.
*F01D 11/00* (2006.01)
*F16J 15/3288* (2016.01)
*F02C 7/28* (2006.01)
*F02K 1/80* (2006.01)
*C04B 35/565* (2006.01)

(52) U.S. Cl.
CPC .... *C04B 2235/75* (2013.01); *C04B 2235/775* (2013.01); *C04B 2237/34* (2013.01); *C04B 2237/58* (2013.01); *F05D 2230/31* (2013.01); *F05D 2240/55* (2013.01); *F05D 2240/56* (2013.01); *F05D 2300/20* (2013.01); *F05D 2300/6033* (2013.01); *Y02T 50/672* (2013.01)

(56) References Cited

U.S. PATENT DOCUMENTS

| | | | |
|---|---|---|---|
| 5,622,474 A | 4/1997 | Werner et al. | |
| 5,941,685 A | 8/1999 | Bagepalli et al. | |
| 6,079,945 A | 6/2000 | Wolfe et al. | |
| 6,648,597 B1 | 11/2003 | Widrig et al. | |
| 6,758,653 B2 | 7/2004 | Morrison | |
| 6,799,765 B2 | 10/2004 | Beichl | |
| 7,181,843 B1 | 2/2007 | Tabbita et al. | |
| 7,798,769 B2 | 9/2010 | Keller | |
| 8,206,087 B2 | 6/2012 | Campbell et al. | |
| 8,562,901 B1 | 10/2013 | Mah et al. | |
| 8,997,496 B2 | 4/2015 | Pelletier et al. | |
| 9,080,457 B2 | 7/2015 | Shi | |
| 9,249,684 B2 | 2/2016 | Lazur et al. | |
| 2004/0256807 A1 | 12/2004 | Bhate et al. | |
| 2006/0121265 A1 | 6/2006 | Thompson et al. | |
| 2008/0199307 A1 | 8/2008 | Keller | |
| 2008/0224415 A1* | 9/2008 | Flaherty | E06B 7/2316 277/355 |
| 2008/0284107 A1 | 11/2008 | Flaherty et al. | |
| 2009/0019685 A1* | 1/2009 | Keith | B32B 7/08 29/469 |
| 2009/0072486 A1 | 3/2009 | Datta | |
| 2009/0078514 A1* | 3/2009 | Baud | C04B 35/624 188/218 XL |
| 2010/0327535 A1 | 12/2010 | Grace et al. | |
| 2014/0363622 A1* | 12/2014 | Lazur | F02C 7/28 428/119 |
| 2015/0003959 A1 | 1/2015 | Duge | |
| 2015/0016957 A1 | 1/2015 | Schinko et al. | |
| 2015/0084285 A1 | 3/2015 | Cernay et al. | |
| 2016/0215645 A1 | 4/2016 | McCaffrey | |

\* cited by examiner

CERAMIC SEAL COMPONENT FOR GAS TURBINE ENGINE AND PROCESS OF MAKING THE SAME

TECHNICAL FIELD

The present application relates to gas turbine engine and its components, and more particularly, but not exclusively, to edge seals of gas turbine engine components, such as, for example, blades, vanes, airfoils, platforms, end walls, shrouds, and engine bypass walls, and methods of manufacturing the same.

BACKGROUND

At least some known turbine engines include an air intake portion, a compressor portion, a combustion portion, a turbine portion, and an exhaust portion. Such known turbine engines produce thrust and/or extract energy from a fluid flow by first compressing the intake air within the compressor portion. Fuel is added to the compressed air, and the mixture is combusted in the combustion portion. The resulting hot, high-pressure gas is then expanded through the turbine portion to extract energy therefrom. Management of such hot gas through the engine and out the exhaust portion may require engine components with edge seals. For example, certain engines have changeable bypass configurations that have bypass duct sections disposed near the combustion portion and in the exhaust portion. These bypass duct sections include metallic brush seals for mechanically sealing sliding airflow and exhaust components during movement between high bypass and low bypass configurations for selective engine power and fuel consumption at different operating modes. Current metallic brush seals experience high thermal signature, severe creep and oxidation at operating temperatures approaching 1800 degrees Fahrenheit. Thus, a need exists for improved engine component seals, and methods for manufacturing the same.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

An engine seal component and a process for making an engine seal component are described herein. The engine seal component may be used for a variety of applications, as will be described. In one example, the engine seal component is a ceramic brush seal that may be used in a changeable exhaust bypass system, and in particular, the exhaust louvers when the gas turbine engine is in a bypass mode. The engine seal component may have a rigid body and a flexible fiber brush edge. In one example, the engine seal component may extend perpendicular to an opposing counterface surface which may move along the brush fibers. When the engine seal component is constructed from an oxide/oxide CMC material, the oxide/oxide CMC brush seal may have more desirable survivability characteristics (for example, low thermal signature) compared to metallic brush seals or SiC/SiC materials at temperature ranging from, for example, about 1800 to 2000° F. The oxide/oxide CMC brush seal has the potential for lower creep and adhesive wear when compared to metallic brush seals at temperatures approaching 1800° F. The processes describe various manners to form a ceramic brush seal integrally with a ceramic seal body, which may be used for any ceramic seal structure.

Figure 1:
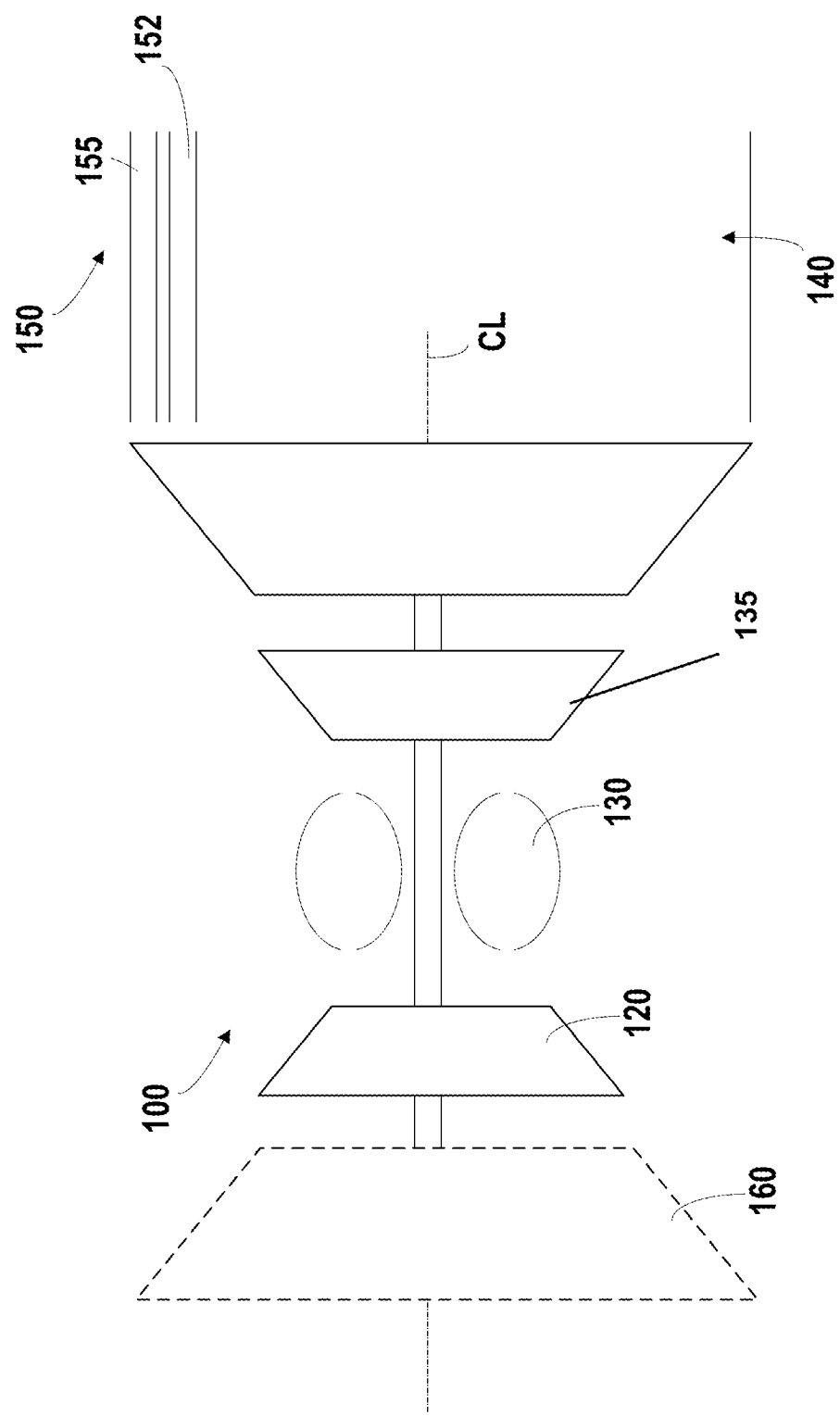
FIG. 1 depicts an example of a gas turbine engine.

FIG. 1 is a cross-sectional view of one example of a turbine engine 100. The engine 100 may include one or more of the following: an air intake portion, a compressor portion 120, a combustion portion 130, a turbine portion 135, and an exhaust portion 140 disposed along a longitudinal axis CL. The engine 100 may be used in any suitable application, such as, for example, to produce thrust in aircraft applications, to drive a propeller in aquatic applications, or to drive a generator in energy applications. In use, air received from the intake portion may be compressed within the compressor portion 120. The compressor portion 120 may include a series of bladed disks to form a multi-stage, axial compressor. The compressed air may be then mixed with fuel and the mixture may be burned in combustion portion 130. The combustion portion 130 may include any suitable fuel injection and combustion mechanisms. The hot, high-pressure gas may be then passed through the turbine portion 135 to extract energy from the gas, which in turn drives the compressor portion 120 while discharging thrust out the exhaust portion 140.

The exhaust portion 140 of the gas turbine engine 100 may include a segmented exhaust system 150 including a first flow passage 152 and a third stream bypass passage (now referred to as the bypass passage 155) that is used to receive air bypassing the engine core and/or working fluid from the engine core. In one example, the flow passage 152 may be a fan bypass passage, such as, for example, used in turbofan engines, and/or may be the bypass passage 155 structured to withdraw a portion of working fluid from the fan bypass passage. In one example, the third stream bypass passage 155 may be used to selectively flow a working fluid to change the engine cycle of the gas turbine engine 100. These types of engines may be referred to as adaptive cycle engines. The gas turbine engine 100 may take on a variety of other forms such as a turboprop, turbofan, or turboshaft engine, to set for a few examples. Furthermore, the gas turbine engine may have any number of spools.

The exhaust system 150 may include different operating modes: a high pressure exhaust; a low pressure bypass; and a third outer flow path within the bypass passage 155 that may be opened and closed in response to operating conditions. The third stream is closed, for example, during takeoff, to allow more airflow through the core for increased thrust. The third stream may be opened, for example, during cruising to increase bypass ratio and reduce fuel consumption. The bypass passage 155 for the third stream may run along the top and bottom of the engine 100. The flow passage 152 and the bypass passage 155 may be annular in configuration, but other configurations are also contemplated. The flow passage 152 and/or the bypass passage 155 may be segmented such that a plurality of bypass passages is created. In one example, the bypass passage 155 may be in the exhaust system, as shown, for selective use between high bypass and low bypass. In another example, the bypass passages 155 may withdraw working fluid from a location between the optional fan 160 (shown in dash lines) and the compressor 120, but other locations are also contemplated herein. In other examples, the bypass passage 155 may withdraw working fluid from a location between stages of a multi-stage fan, or may be combined in a nozzle with the flow passage 152 and engine core flow, but in other embodiments, the working fluid can be dumped overboard. In one example, the bypass passage 155 may be ducted in a non-annular manner.

The bypass passage 155 may include a device or devices useful for closing off a portion of the bypass passage 155. The device may take a variety of forms and may be deployed using a variety of mechanisms. In one example, the device may be a combination of a brush seal segment extending between the top and bottom bypass surfaces of the bypass passage 155 that move relatively to one another as commanded for closing and opening the bypass passage, as will be described.

Figure 2:
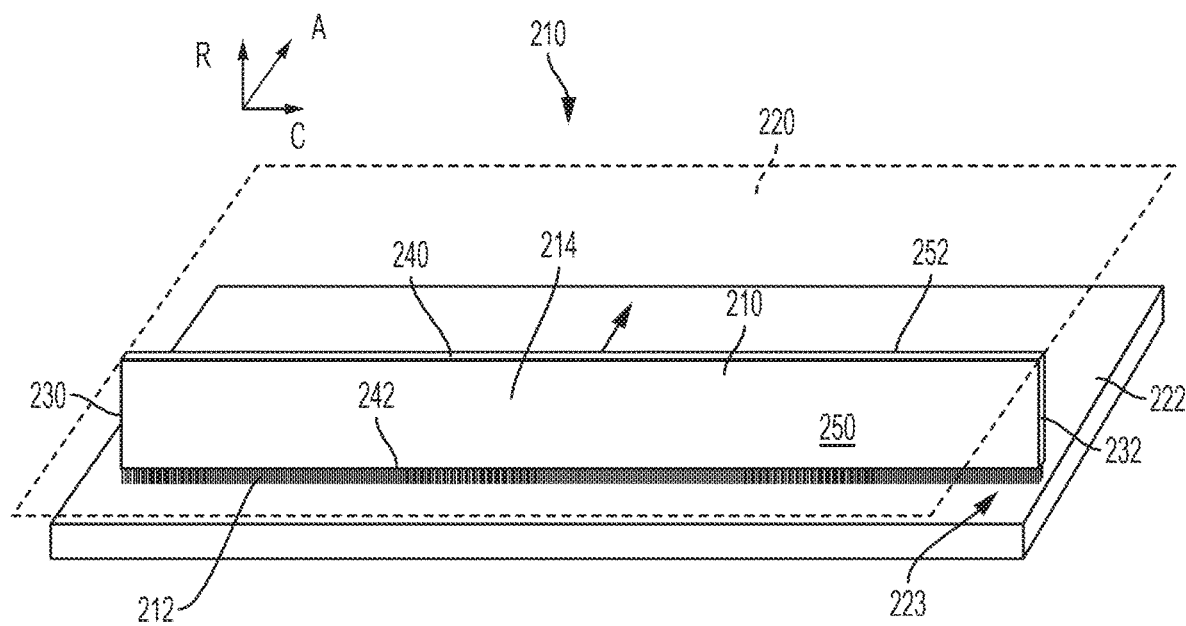
FIG. 2 depicts an example of an engine seal component extending between duct sections.

FIG. 2 illustrates an engine seal component 210 utilized in the gas turbine engine 100. The engine seal system in FIG. 2 includes a first section 220 and a second section 222 that define a passage 223 therebetween. The edge seal 212 is shown coupled to the first section 220 and extending between the first section 220 and the second section 222. The edge seal 212 is supported by the structural body portion 214. The edge seal 212 may extend along the second section 222 in a sealing interface configuration. In one example, the structural body portion 214 of the component 210 may include a plurality of woven ceramic fiber stacked plies, as will be described. The edge seal 212 may include ceramic fibers extending away from the structural body portion 214. At least one of the first section with the ceramic seal component and the second section are movable relative to one another to define an open configuration and a closed configuration of the passage 223, as will be described.

The edge seal 212 of ceramic fibers may inhibit and control fluid flow between engine portions or other components. The engine seal component 210 may be provided to or along blade platforms, vane end walls, shroud edges, exhaust bypass sections, and other gas turbine engine components. In one example, the engine seal component 210 may be referred to as ceramic brush seal. Reference characters A, R, and C define a coordinate system representing the respective axial axis, radial axis, and circumferential axis or directions of the engine seal component 210 relative to the longitudinal axis CL of the gas turbine engine of which it is a part.

In an example, the engine seal component 210 may be include a ceramic structural body portion 214 along which the edge seal 212 is disposed. The body portion 214 may comprise a ceramic matrix composite (CMC). In one example, the body portion 214 is formed from one or more plies stacked. As will be described, the plies may be pre-impregnated ceramic preforms of woven ceramic fiber fabric or dry woven ceramic fiber fabric subsequently infiltrated by a ceramic matrix slurry. The body portion 214 may be formed to any desired shape for an engine environment, not just the shape illustrated in the figures. The edge seal 212 may include ceramic fibers disposed along one or more edges of the body portion 214 to define a brush seal. In one example, the ceramic fibers of the edge seal 212 may extend away from the body portion 214. Alternatively or in addition to, the ceramic fibers of the body portion 214 define the edge seal 212. In one example, ceramic fibers for forming the edge seal may be ceramic fibers provided in the woven fabric of the plies used in the body portion 214. Further details as to the body portion and the edge seal will be described. In one example, the plurality of fibers defining the edge seal 212 defines a less (for example, at least 95% or less) infiltrated portion than the matrix infiltrated body portion 214. The ceramic fibers defining the edge seal 212 is more flexible (for example, at least twice as flexible) than the body portion 214. In one example, the flexibility of the fiber edge seal maintains the flexibility that is characteristic of the ceramic fabric fiber alone.

In one example, the edge seal 212 is provided along the body portion 214 to reduce the leakage at the interface between the bypass duct section of the bypass passage and exhaust duct section of the flow passage, described previously. Although the edge seal 212 is described herein in the context of the engine seal component 210 of the bypass passage 155, the edge seal 212 may be applied to any gas turbine engine seal component for which sealing is desired. The engine seal component 210 is shown extending radially from the first section 220 such that the edge seal 212 is disposed against the second section 222 radially spaced from the first section 220. The second section 222 and the first section 220 may be formed from an uncoated or coated metal alloy, an organic matrix composite (OMC), ceramic matrix composite (CMC) or a monolithic ceramic tile to withstand the high temperature environment. The engine sections 222, 220 may together define the passage 223. The second section 222 may be associated with another flow passage, such as the flow passage 152. The edge seal 212 may be oriented perpendicular to the second section 222. The use of first and second to describe the engine section are for illustrated purposes, and the edge seal may be oriented in the opposite upright direction or in lateral directions to extend between a pair of duct surfaces or other engine sections.

The engine seal component 210 is shown having a rectangular cross-sectional shape along at least one of the axes A, R, C, and in some examples, all of the axes. In one example, the structural body portion 214 of the engine seal component 210 includes a rectangular cross-sectional shape along all of the axes. It is contemplated that the engine seal component 210 may have other cross-sectional shapes, including but not limited to rectangular, circular or ellipsoidal, along any of the axes, such as, for example, to provide an engine component with variable thickness for added strength. The body portion 214 of the engine seal component 210 includes a circumferential width sized between opposite circumferential edges 230, 232, a radial height sized between upper and lower portion edges 240, 242 of the body portion 214 disposed opposite to one another, and a body thickness sized between a downstream face 250 and an upstream face 252 obverse to the downstream face 250. The height of the edge seal 212, in addition to the radial height of the body portion 214, will contribute to an overall height of the engine seal component. In one example, the radial height of the engine seal component 210 spans between the engine sections 220, 222.

Figure 2A:
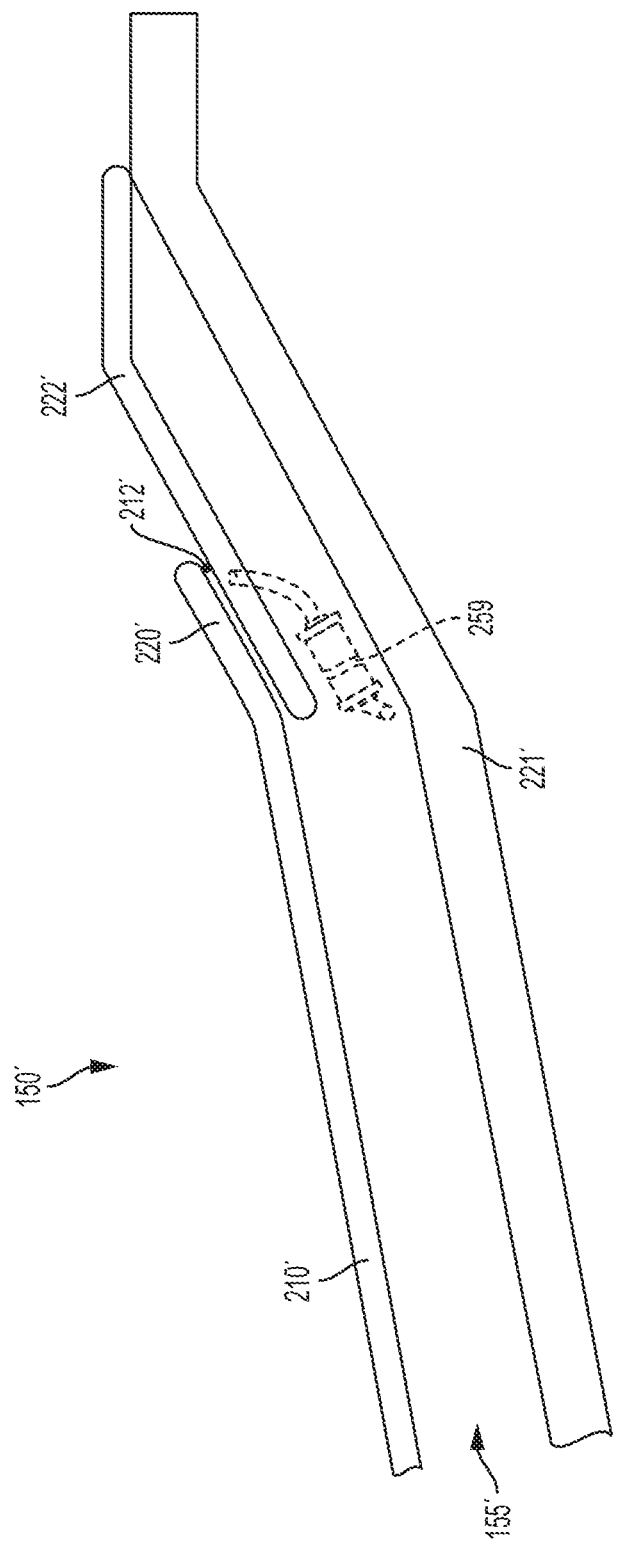
FIGS. 2A-2B depict operation of the engine seal component in FIG. 2.
Figure 2B:
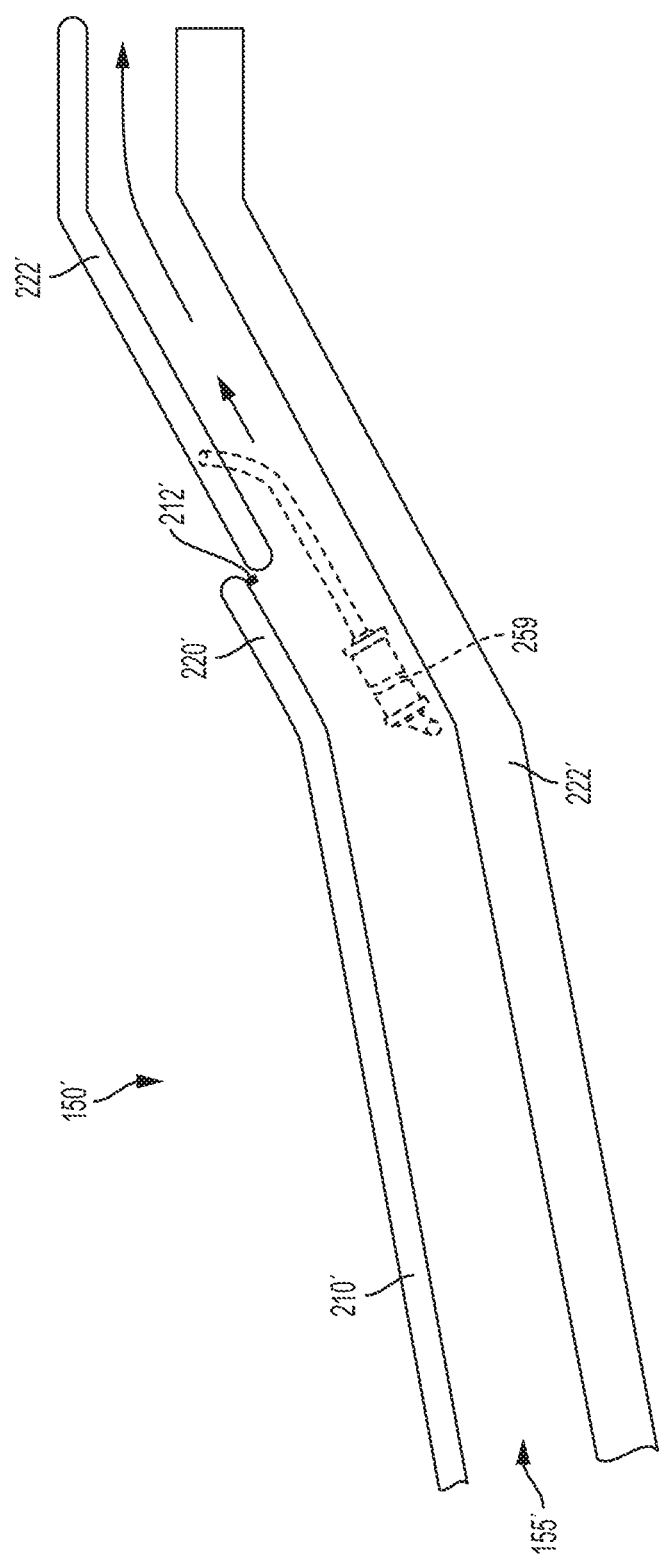

FIGS. 2A-2B depict a nonlimiting example application of the engine seal component used in the bypass passage (now 155') of an example of the segmented exhaust system (now 150'). The engine seal component 210' is shown as a bypass section 220' and the duct louvre section 222' may be movable relative to one another for selectively closing (FIG. 2A) and opening (FIG. 2B) the bypass passage 155' defined between the bypass duct section 220' and another bypass duct section 221'. In one example, the engine seal component 210' is in a fixed position with the duct section, and the duct louvre section 222' is movable in an angled axial direction. It is contemplated that the duct louvre section 222' may be in a fixed position, and the engine seal component 210' is movable in some direction. In one example, the duct louvre section 222' may define a planar surface, and the edge seal 212' is disposed in a perpendicular relationship with the duct louvre section 222'. The duct louvre section 222' is shown coupled to an actuator 259 that is configured to move the duct louvre section. The actuator 259 may be linear actuator including a solenoid and a piston/rod assembly. The actuator may also be configured for electrohydraulic or electropneumatic operation. As appreciated by one of ordinary skill, the duct sections 220' and/or 221' and/or the engine seal component may be coupled to the actuator 259 for respective movement. The actuator 259 is commanded to move between positions based on a determined output signal from an engine controller (not shown) based on one or more inputs (user or auto selected engine mode and other engine parameters) and stored maps accessible by the engine controller.

FIG. 2B depicts the duct louvre section 222' linearly movable along a common plane relative to the edge seal 212 that is oriented orthogonal relative to the duct louvre section 222'. When in the open configuration, as shown in FIG. 2B, the bypass passage 155' is configured to provide a portion of bypass cooler air (see arrow) to the hotter exhaust gas that is separated from the bypass air by the duct section 220'. The edge seal is operable to inhibit premature mixing of the cooler bypass and hotter exhaust gas. Though the bypass passage 155' is shown in FIG. 2A being closed at a aft portion, other locations for the device are also contemplated herein. The aft portion in which the device is used may either be coincident with the opening at an aft end of the bypass passage, or may be located somewhat upstream from the aft end but still far enough downstream from a forward end of the bypass passage. In another example, the bypass passage may be closed off at a forward portion of the bypass passage 155', which is opposite to the aft end shown in FIG. 2A. The forward portion may be either coincident with an opening at the forward end of the bypass passage 155', or may be located somewhat upstream from the forward end. In a still further embodiment, the bypass passage may be closed at a location intermediate the forward portion and aft portion.

Figure 3:
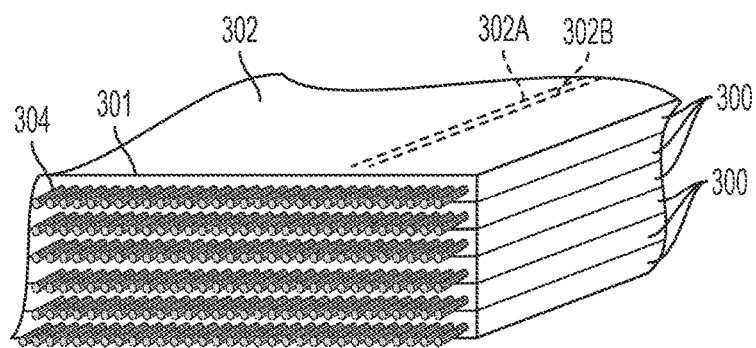
FIG. 3 is a partial section of the engine seal component in FIG. 2, depicting a stack of plies with a brush seal along a single edge.

FIG. 3 depicts the engine seal component 210 formed with a ply lay-up fabrication process, and it may be understood that other fabrication processes may also be suitable. The plies may be preimpregnated (also referred to herein as "prepreg") ceramic preforms of woven ceramic fabric, where the preform or fabric is pre-impregnated with a pre-ceramic polymer or ceramic slurry, for example that becomes tacky and allows bonding when the plies are in contact with each other. In another example, the plies may be dry woven ceramic fabric configured to receive a ceramic matrix, rather than being preimpregnated as found in prepreg ceramic preforms. The plies used may have a rectangular sheet configuration or be cut into any other shapes, such as, for example, circular or annular, selected to achieve the desired final shape. For example, a plurality of plies 300 may be placed in a stacked relationship. Each of the plies 300 may have a common thickness, radial height and circumferential width, although it is contemplated that at least one of the plies 300 may have different thicknesses, heights and/or widths. Further, one or more of the plies 300 may form a layer, and a plurality of different layers may form the engine seal component. The number of plies 300, plies per layer, and the number of layers for the engine seal component 210 may be selected based on the particular application of the engine seal component and the gas turbine engine.

Each of the plies 300 may be defined by a ply body 302 and a plurality of fibers 304 extending from the ply body 302. The ply body 302 may be defined by a matrix infiltrated portion for forming a CMC rigid body and including a ceramic fibers (for example, defined by the dashed lines 302A) and a ceramic matrix 302B (for example, shown just outside the dashed lines), as understood by one of skill in the art. The fibers 304 may include ceramic fibers, and may be woven to include weft fibers and warp fibers, which is less infiltrated than the ply body 302. One of the weft and warp fibers, shown as the fibers 304, may project from an edge 301 of the ply body 302 and is less rigid (or more flexible) than the ply body 302. In one example, the fibers 304 may be integral with the fibers that define the CMC rigid body of the ply body 302. In one example, the fibers 304 project from the ply body 302 in an unidirectional arrangement, for example, extending in the radial direction that is generally orthogonal to the circumferential direction (or parallel to the radial axis) that the rigid body 302 is shown extending. In other examples, the fibers in one of the plies may extend at any angle in an unidirectional arrangement, such as for example, 30, 45, 60 degrees relative to the radial axis. In another example, adjacent plies may include unidirectional fibers extending at different angles than the unidirectional arrangement of the adjacent ply to strengthen the stacked ply configuration. The fibers 304 are shown extending from the ply body 302 by a desirable dimension depending on the application and sealing performance sought. In one example, the fibers 304 extend about 0.25 inches from the bottom of the ply body 302, but may extend any length ranging from 0.010-1.0 inches.

As shown in FIG. 3, the plies 300 when stacked may be oriented such that the fibers 304 of each of the plies 300 are in alignment. As shown, the engine seal component 210 may include six oriented plies 300. The aligned fibers 304 of the plies 300 define the edge seal 212 of the engine seal component 210, and the aligned ply bodies define the structural body portion 214. The flexibility of the fibers 304 may be due to the fibers remaining substantially free (95% or more free) of ceramic matrix. In another example, one or more plies 300 of the stack may be offset relative to others in order to vary the seal edge and its flexibility.

Figure 4:
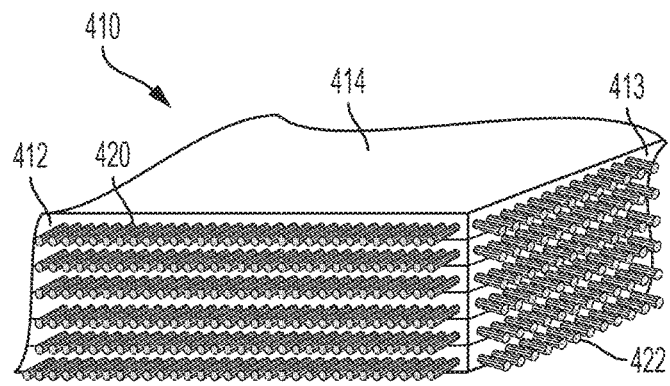
FIG. 4 is a partial section of another example of an engine seal component, depicting a stack of plies with a brush seal along multiple edges.

The engine seal component 210 may include more than one edge seal. FIG. 4 illustrates an example of the engine seal component (now referred to as 410) including a first edge seal 412 and a second edge seal 413 along the structural body 414 for providing sealing along multiple edges. The plies include the fibers projecting from the ply body in a bidirectional arrangement. One portion of the fibers may extend at one angle relative to the radial axis, with a plurality of first fibers 420 shown parallel to the radial axis to define the first edge seal 412. Another portion of the fibers may extend at a different angle relative to the radial axis such that each portion of the fibers intersect, with a plurality of the second fibers 422 shown perpendicular to the radial axis to define the second edge seal 414. The intersection of the first and second fibers 420, 422 form an intersection angle of about 90 degrees relative to each other. The engine seal component 410 may include three, four, or more edge seals depending on the application and shape of the engine seal component.

Figure 5:
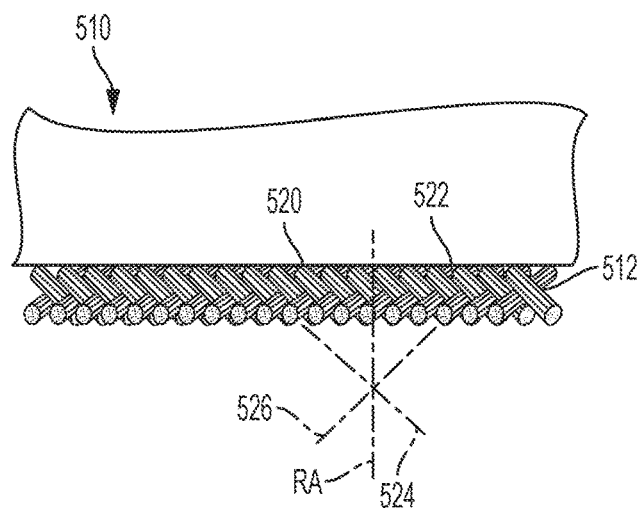
FIG. 5 is a partial section of another example of an engine seal component, depicting an edge seal with bidirectional fibers.

The ceramic fibers of the engine seal component 210 may include other intersecting angles in bidirectional arrangements, such as between about 30 and about 60 degrees, are contemplated. FIG. 5 shows a bidirectional arrangement along one of the edge seals 512 of an example of the engine seal component (now referred to as 510). For example, the first fibers 520 may extend at about a 45 degree angle along a first axis 524 relative to the radial axis RA, and the second fibers 522 may extend at a −45 degree angle along a second axis 526 relative to the radial axis RA. In other examples, it is contemplated that the fibers defining the seal edge may extend in more than two directions (or multidirectional) in predefined directions or in random directions.

Figure 6:
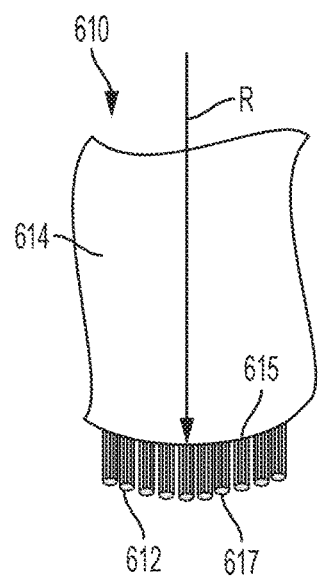
FIG. 6 is a partial section of another example of an engine seal component, depicting a brush seal along a rounded edge.

The engine seal component 210 may include a non-rectangular body. FIG. 6 depicts an example of the engine seal component (now referred to as 610) having a rounded seal edge 612 define by radius R, which may be more suitable for annular duct passages. The structural body 614 of the engine seal component 610 includes a rounded edge 615, and the seal edge 612 extends along the rounded edge. In other words, the ends of the fibers may be configured to form a rounded edge 617. The fibers forming the seal edge 612 may be unidirectional (as shown), bidirectional, or multidirectional as described above.

One or more additional components may be integrated into any one of the disclosed engine seal components. In one example, a component body or features (made either from CMC or non-CMC materials), such as, for example, attachment features or thermal shields, may be formed prior to integration or coupling to the edge seal formed by the plies in the layup fabrication process. In another example, a component body or features may be integrally formed with the edge seal with the same plies in the layup fabrication process. In another example, the seal component may form a partial component for attachment or bonding to blade platforms, vane end walls, shroud edges, or other gas turbine engine components.

Figure 7:
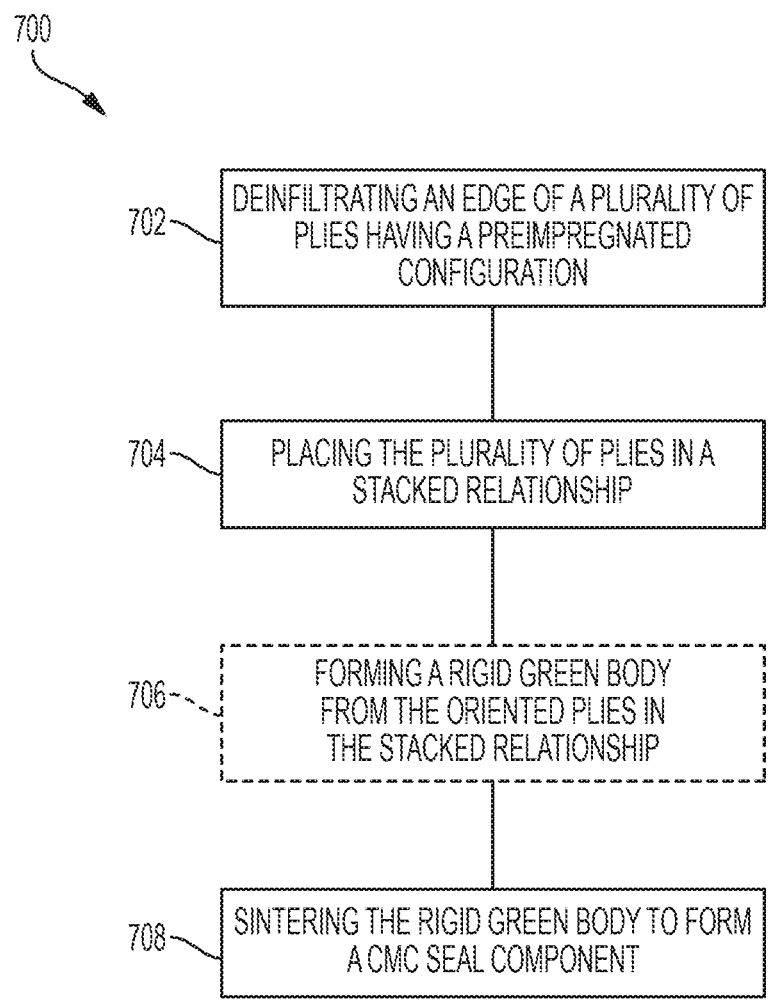
FIG. 7 is a flow diagram of an example of a process of manufacturing an engine seal component.
Figure 8:
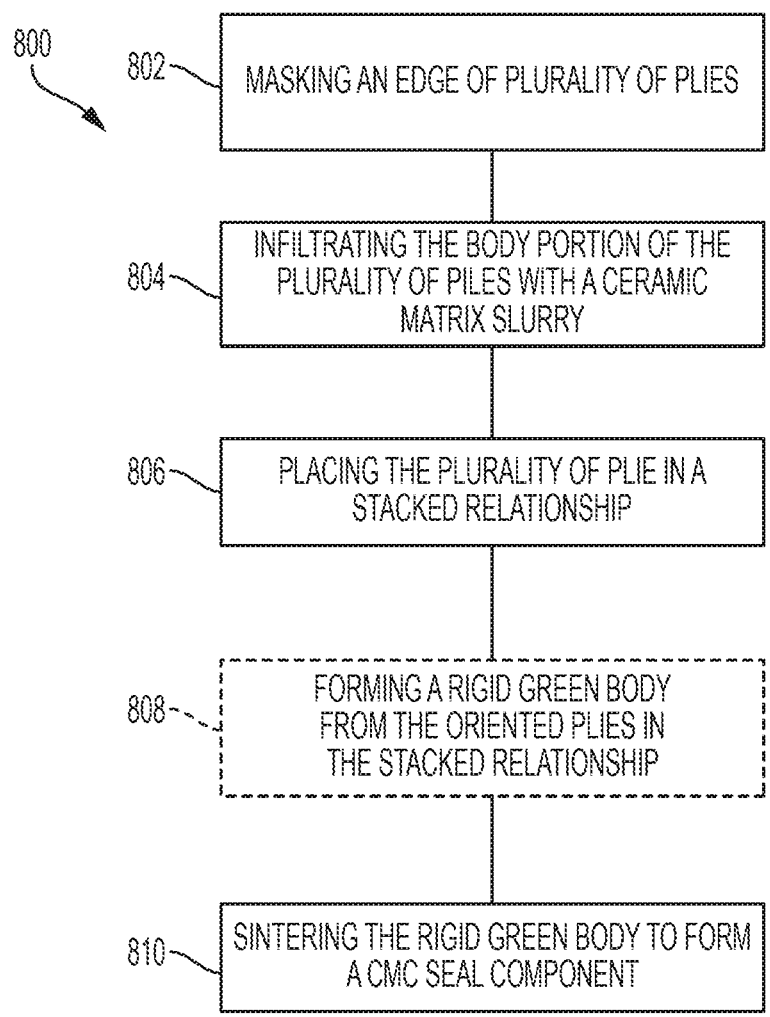
FIG. 8 is a flow diagram of an example of a process of manufacturing an engine seal component.

FIG. 7 illustrates one example of a process of manufacturing, shown as 700, one of the disclosed engine seal components utilizing woven, braided or otherwise crossing fibers in prepreg plies. The fibers may be oxide fibers or fiber preforms that are infiltrated with an oxide ceramic. One example, of an oxide ceramic textile ply is NEXTEL™ 720, such as the EF-19 cloth (3000 denier, 8HS weave 19 ounces/yard$^2$) provided by 3M. The fiber configuration may be wound ribbons, woven fabric, or multi-axial woven structures. The fiber configuration may include chopped fibers that are aligned directionally (unidirectional, bidirectional, or multidirectional) or randomly distributed. The matrix material of the composite may be oxide, such as for example, alumina, YAG, mullite, zirconia, zircon, spinel, or cordierite.). The matrix material selected may have suitable properties for the selected fibers, such as, for example, the coefficient of thermal expansion of each may be matched to reduce thermal strain between the fibers and matrix, while improving composite strength and deformation behavior at elevated temperature. The oxide ceramic textile ply may be cut into suitably sized pieces for creating the blank from which the brush seal segment will be cut.

The number of plies to be used may be determined by the desired thickness and orientation of the construct after firing or sintering. In one example, six plies of prepreg oxide ceramic textiles are selected to yield, when stacked, a fired panel thickness ranging from 0.06-0.09 in. After determining the number of plies, the desired length of the edge seal is predetermined based on the application of the engine seal component and the functionality of the seal. The longer the fibers exposed may yield a more flexible edge seal, while shorter exposed fibers may yield a more durable seal. After determining the length, each of the prepreg plies is processed to expose a segment of wet infiltrated fibers. For example, the prepreg ply is marked on the polyethylene sheet from the bottom edge, such as, for example about 0.3 inches. Along the marking, the polyethylene sheet is cut away on both sides of prepreg ply to expose the wet infiltrated fibers.

At step 702, removal of the ceramic matrix from the wet infiltrated exposed fibers may be performed by a deinfiltration process in one on more steps. For example, the deinfiltrating step may include using a deinfiltration fluid, such as a solvent or water is configured to dissolve the ceramic matrix, such as, for example, ethanol, isopropanol or water. The deinfiltration fluid may be applied to the wet infiltrated exposed fibers by any number of processes, such as by dipping, spraying, or brushing. In one example, a container of solvent having a depth of solvent less than the length of exposed fibers is provided, such as, for example, a depth of 0.1 inches of deinfiltration fluid depth. The deinfiltration enhancer, such as an ultrasonic agitator, may be provided with the solvent container. Alternatively, the fibers may be mechanically agitated by vibration in solvent. The entire edge of ceramic slurry infiltrated exposed fibers of the CMC prepreg sheet may be flushed by immersion or spraying with solvent for a period of time, leaving the matrix infiltrated fabric portion intact without deinfiltration. After removal, the solvent remaining within the exposed deinfiltrated fiber edge may be removed by drying in circulating airflow and by contact with an absorbent pad. In other examples, more than one single ply may be immersed and flushed in a similar manner.

After the deinfiltration, removal of extraneous fibers from the exposed deinfiltrated fiber edge may be performed to free the fibers and define the edge of the ply body. For example, any cross-woven fiber tows may be pulled away and removed from the cloth by a mechanical combing process to inhibit damage done to the remaining fibers. In one example, the extraneous fibers are removed until a length of free vertical fibers remains, such as, for example, about 0.25-inch length.

After removal of extraneous fibers, additional deinfiltration steps, such as described above, may be performed to remove any remaining ceramic matrix from the exposed free fibers. In one example, the length of exposed free fibers may be dipped in the container of solvent one or more times (such as, for example, three times) so that substantially no matrix residue (less than V %) remains on the exposed free fibers of each of the prepreg plies.

After the exposed free fiber edge is deinfiltrated, the wet prepreg plies with the exposed free fibers may be placed in a stacked relationship for the desired thickness and orientation (step 704). In one example, six prepreg plies are layed up in an alternating 0°/90° or ±45° orientation. The stacked wet prepreg plies may be layed upon a first flat plate, such as an aluminum plate, with a release film. A roller or vertical press apparatus may be used across the stacked plies to compress the stacked wet prepreg plies and bond them together. A second flat plate covered with a release film on the contacting side is placed over the stacked wet prepreg ply construct.

In the case of silicone-based slurries, the stacked wet prepreg ply construct may be then cured into a rigid green body. The rigid green body has pre-ceramic polymer matrix material structure that is formed prior to firing. The rigid green body is achieved by applying pressure and/or heat to the stacked construct for forming the rigid green body (step 706). Step 706 is shown dashed as the step may be altered into drying into the green state for aqueous based slurries. For example, the wet prepreg plies may be cured by heating and/or pressurizing with a heated isostatic hydraulic press, an autoclave or oven vacuum bagging. This curing step may facilitate the evaporation of water in aqueous slurries and light organic compounds in silicone-based slurries based on siloxanes, silanes and silazanes. The curing time and temperature profile may be selected to enable subsequent deinfiltration of the fibers in the green state while maintaining the CMC plate structure. For example for silicone-based slurries, the curing temperature may be between room temperature or slightly warmer, such as 85° F., to up to about 400° F., and the curing duration and subsequent cooling duration may vary depending on the matrix and fiber composition as understood by those of skill in the art. It is contemplated that certain slurry mixtures may require drying into a green state. For example, water based slurries, such as but not limited to aqueous colloidal silica or water-based oxide ceramic may be dried after layup. After drying, the green ceramic structure may then go through a firing process, as will be described.

As an optional step, the exposed free fiber edge after molding or pressing into the rigid green body may be further deinfiltrated with the deinfiltration fluid, such as described above. For example, the exposed free fiber edge of the rigid green body is flushed or immersed in water or solvent to dissolve any cured matrix slurry in the region of the exposed free fiber edge and further free the fibers along the edge. Deinfiltration may be enhanced by ultrasonic agitation of the solvent during the flushing and immersion process via mechanical agitation of the fibers. One or more immersion/flushing processes may be performed until little or no residual matrix remains on the fibers. The as-fired mechanical stiffness of the fibers may be controlled by the diameter of the fibers and/or the amount of residual matrix film remaining on the fibers after deinfiltration. Too much residual matrix remaining on the fibers may result in fiber embrittlement after firing.

At step 708, after the curing or drying step or final deinfiltration steps, the rigid green body may undergo firing as a freestanding part in a furnace operable in an air atmosphere using a temperature-time profile to enable transformation of the matrix of the rigid green body to mullite ($3Al_2O_3$-$2SiO_2$). This step may achieve the removal of any remaining solvent. For example, the firing temperature may be between about 400° F. to up to about 2200° F., and the duration and subsequent cooling duration may vary depending on the matrix and fiber composition as understood by those of skill in the art.

After the firing step, the resultant composite may be near final or may be final into any one of the disclosed engine ceramic seal components with the body portion and the brush seal fibers extending beyond the edge portion of the body portion. When near final, additional machining process may be applied to the resultant composite in order to remove material and form the final shape, size, and configuration of any one of the disclosed engine seal components to its desired specifications. For example, edges of the resultant composite may be ground or polished, such as with 120 grit or finer mesh SiC or diamond abrasive tooling to form the final ceramic seal component. The resultant composite may be further finished to receive attachments such as brackets or gaskets to allow secure fastening of the component, provided that it does not adversely affect the structural integrity of the fibers and matrix.

In another example, any one of the disclosed engine seal components may be undergo a manufacturing process 800 with a positive infiltration process using plies of dry uninfiltrated oxide ceramic fabrics, rather than prepreg ceramic preforms. During the infiltration process of the engine seal component, one or more edges of the component is infiltrated less than the remaining body portions of the engine seal component (804). Less infiltration results in less matrix material, which, in turn, may result in the edge being less stiff, that is, more compliant or flexible. For example, the body of the each of the non-impregnated plies with more slurry infiltration than the edge portion may be infiltrated with an oxide ceramic slurry. For example, the slurry may be applied to the plies by immersing the appropriate ends of the plies into a slurry bath. In addition, ceramic infiltration may be provided using a polymer infiltration and pyrolysis process (PIP), a chemical vapor infiltration (CVI), a chemical vapor deposition (CVD) process, slurry infiltration process, and/or melt infiltration (MI) process.

Prior to the infiltrating step, at step 802, the method may include a masking step of one or more plies to inhibit the flow of matrix into the masked free fibers along the one or more edges during the isostatic pressing or vacuum bagging step. The masking applied may be suitably located at a certain depth into the ply body or bodies for defining the edge seal length at a desirable length. In one example, the masking may include chemical masking. The chemical masking may include the application of a chemical substance soluble in water or organic solvent, such as, for example, a wax, liquid, paste, and/or emulsion, to the free fibers along the one or more edges. The chemical substance used in masking is operable to withstand green molding temperatures of the oxide CMC (such as, for example, up to 400° F.), yet burn off cleanly during the firing step of the oxide CMC, with appropriate attention to burn off without causing fiber embrittlement. In one example, the chemical mask is removed during the firing step by being burned off. Careful selection and application of the chemical mask to the free fibers should inhibit wicking of the chemical mask to regions outside the free fibers.

In another example, alternatively or in addition to the chemical mask, the masking may include a mechanical mask. In one example, the mechanical mask may include a mesh screen. The mesh screen may be formed from a metallic, polymer or ceramic fiber. The mesh screen includes a porosity sized to receive the free fibers and to inhibit the flow of matrix into the masked free fiber region during infiltration. The mesh screen may be placed perpendicular to the fiber direction, with the fiber being inserted or woven into the pores of the mesh. The mesh screen is located at a certain depth into the ply body for defining the edge seal length. The mesh screen may be removed from the fibers after the structure is cured or dried into the green body and prior to firing.

In another example, the mechanical mask may include a clamping apparatus. Here, the free fibers may be inserted within the parallel plates of a clamping apparatus. The parallel plates are sized to extend circumferentially across the fibers and at a suitable edge depth. The clamping apparatus may be activated, such as, for example, manual cranking, pneumatically, hydraulically, or electrically, to clamp the free fibers with the paralleled plates with sufficient force until minimal space between the masked fibers exists to withstand the flow of matrix during infiltration. The clamping depth is located at a certain depth into the ply body for defining the edge seal length The clamping apparatus may be removed from the fibers after the structure is cured or dried into the green body and prior to firing.

Alternatively or in addition to any one of the mechanical masks disclosed herein, the structure may be oriented upright in a manner such that the free fiber edge ends are upward relative to the body to inhibit the flow of matrix into this region during infiltration due to gravity. Alternatively or in addition to any one of the mechanical masks disclosed herein, the structure may be pressurized to control of the flow of matrix during infiltration. For example, a positive pressure with an inert fluid (room air or inert gas), using a compressor system, may be applied along the transition region between the free fibers and the body to inhibit the flow of matrix into the free fiber region during infiltration. In another example, a negative pressure using a vacuum system may be applied along the end opposite to the free fiber region to draw the flow of matrix to the body region and inhibit the flow of matrix into the free fiber region during infiltration. The pressure difference created by negative or positive pressure systems may control the flow of slurry. The masking from pressure may be removed.

Alternatively or in addition to any one of the chemical and/or mechanical masking disclosed herein, particles, specks, flake, shavings, or pellets of material that are oxidized, etched, dissolved, vaporized, sublimated, or otherwise removed after some stage of composite processing to leave a void. For example, flaked graphite may be inserted along the transition between the free fibers and the body region and/or within the free fiber region. The flaked graphite may be removed mechanically or by oxidation. In another example, a material (e.g., boron nitride, carbon, molybdenum disulfide) may be applied to the free fiber region to impair the bond between fibers and matrix.

A period of time after the infiltration step may permit the settling and evaporation of the solvents used in the infiltration process. The settling time may depend on the composition of the matrix used for infiltration. The plies may now have tacky surfaces.

The tacky plies with the exposed free fibers may be placed in a stacked relationship for the desired thickness and orientation (806). In one example, six plies are stacked. The plies may be layed upon the first flat plate with a release film, previously disclosed. The roller or vertical press apparatus may be used across the stacked plies to compress the stacked plies further to reduce any interior spacing between the plies and bond them together. The second flat plate covered with a release film on the contacting side is placed over the stacked ply construct.

At step 808, the stacked wet ply construct is then cured for forming a rigid green body in the case of silicone-based slurries, like in step 706, for a suitable temperature and time, and then allowed to cool for a suitable time. Step 808 is shown dashed as the step may be altered into drying for forming the green body state for aqueous based slurries. The exposed free fiber edge after molding or pressing into the rigid green body may be deinfiltrated with the deinfiltration fluid, such as described above. As described above, when the construct is from a water-based slurry, the process of curing involves drying into a green state. After the curing step and/or the deinfiltration steps, the green construct may undergo firing (810) as a freestanding part in the furnace, as described above.

After the firing step, the resultant composite may be near final or may be final into any one of the disclosed engine seal components with the body portion and the brush seal fibers extending beyond the edge portion of the body portion. When near final, additional machining process may be applied to the resultant composite in order to form the final shape, size, and configuration of any one of the disclosed engine seal components to its desired specifications. For example, edges of the resultant composite may be ground or polished, such as with 120 grit or finer mesh SiC or diamond abrasive tooling to form the final ceramic seal component. The resultant composite may be further finished to receive attachments such as brackets or gaskets to allow secure fastening of the component, provided that it does not adversely affect the structural integrity of the fibers and matrix.

Figure 9:
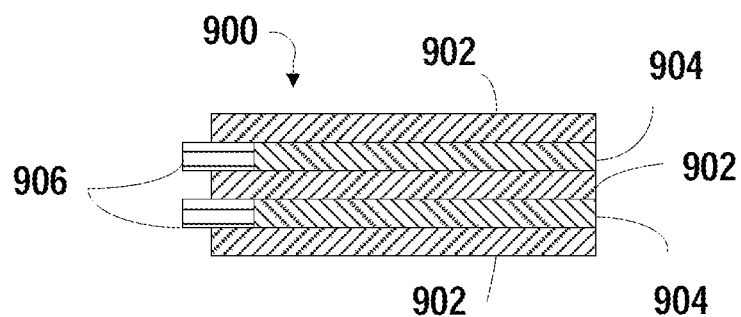
FIG. 9 is a sectional view of another example of an engine seal component.

In another example, both dry oxide ceramic fabric plies and prepreg ceramic preform plies may be used for forming the engine seal component using a similar process as in the process 700. FIG. 9 depicts the engine seal component 900 including first prepreg ceramic preform plies 902, second prepreg infiltrated ceramic preform plies 904, and dry unfiltrated oxide ceramic fabric plies 906 in a stacked relationship. The first prepreg ceramic preform plies 902 form layers alternating with layers formed by the second prepreg ceramic preform plies 904 and dry oxide ceramic fabric plies 906. The first prepreg ceramic preform plies 902 and the second prepreg ceramic preform plies 904 may be sized differently. In one example, the first prepreg ceramic preform plies 902 are sized to extend beyond the second prepreg ceramic preform plies 904. Extending from the spaces created by size difference between the first and second prepreg ceramic preform plies 902, 904 are the dry oxide ceramic fabric plies 906 which are adjacent the preform plies 904. The dry oxide ceramic fabric plies 906 are sized to extend beyond the first prepreg ceramic preform plies 902. In one example, the dry oxide ceramic fabric plies 906 includes a first portion overlapping the first prepreg ceramic preform plies 902, and a second portion extending beyond the plies 902 for defining the free fiber edge. In one example, the first portion may abut or be engaged with the edge of the prepreg plies 904. In another example, the first portion may overlap the edge of the prepreg plies 904, or a gap may exists between the two plies. The prepreg plies 902, 904 may define the more rigid structural portion of the engine component. The prepreg plies 902, 904 may secure dry plies 906 sandwiched in alternate layers. In another example, the first prefrom plies 902 are sized to extend to the tip of the fabric plies 906 and form a portion of the seal edge after deinfiltration. During the forming process, matrix from the prepreg plies may wick or infiltrate the first portion of the dry plies. Masking, such as described above, may be used to prevent infiltration into the second portion. Deinfiltration processes may be utilized to rid the second portion of any matrix. With the use of the combination of plies, less deinfiltration may be needed, which may show an improvement in the speed and costs of manufacturing.

Figure 10:
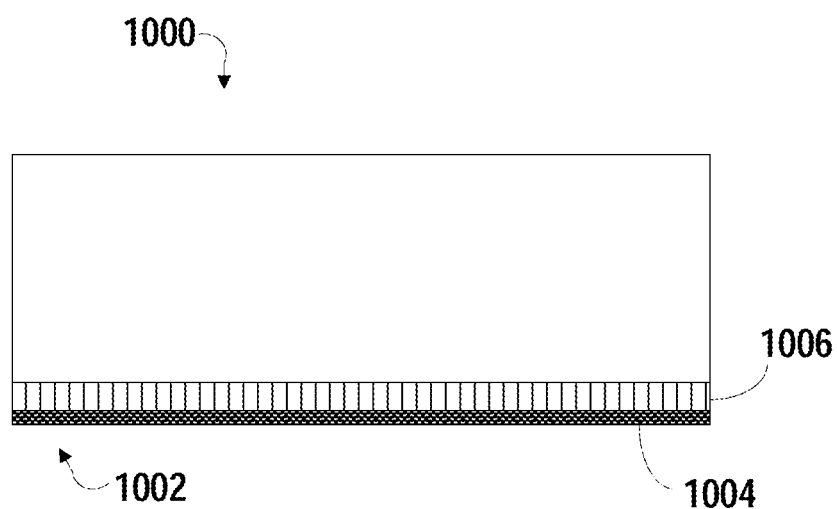
FIG. 10 depicts another example of an engine seal component.

As described above, extraneous fibers may be removed from the exposed fiber edge to free the fibers along the seal edge. In another example, the seal edge 1002 of the engine seal component 1000 may be configured as a drape end 1004, as shown in FIG. 10. As an optional step in any one of the processes 700 or 800, the ply end may sewn up with a threading to form the drape end. To this end, a portion or none of the cross-woven fiber tows may be removed. Instead, the fabric end is sewn up with a threading, such as a Nextel thread, to prevent unraveling of the free fibers. This may occur prior to layup or stacking step, deinfiltration step, or infiltration step. This configuration may provide the engine seal component with a flexible fabric drape seal extending from the structural seal body rather than free brush fibers. In one example, the end cross-woven fiber tows remain in place and a segment of cross-woven fiber tows immediately adjacent to the remaining end cross-woven fiber tows are removed. This configuration may provide a seal having the drape end 1004 with an exposed fiber segment 1006, that may provide additional flexibility to the drape seal. When less adjacent tows are moved and/or more threading is sewn, a smaller portion of the free fibers are exposed and a more solid drape end may be formed. In one example, the drape end is in fully woven fabric.

Although the processes disclosed herein have been described with oxide/oxide CMC's, one of ordinary skill in the art may make suitable modifications to the process steps for other CMC composites, such as SiC/SiC composites. When the component is constructed from an oxide/oxide CMC material, the oxide/oxide CMC brush seal may have a lower thermal signature compared to metallic brush seals or SiC/SiC components at temperature ranging from about 1800 to 2000° F. The oxide/oxide CMC brush seal may have the potential for lower creep and adhesive wear when compared to metallic brush seals or SiC/SiC materials at temperature ranging from about 1800 to 2000° F. The processes describe various manners to form a ceramic brush fiber seal integrally with a ceramic seal body.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

Furthermore, the advantages described above are not necessarily the only advantages, and it is not necessarily expected that all of the described advantages will be achieved with every embodiment.

The subject-matter of the disclosure may also relate, among others, to the following aspects:

1. A process of manufacturing a ceramic seal component, comprising: deinfiltrating an edge of respective preimpregnated plies such that the deinfiltrated edge is defined by a plurality of ceramic fibers extending away from a portion edge of a matrix infiltrated portion of each of the plies, the plurality of ceramic fibers defining a less infiltrated portion than the matrix infiltrated portion; placing the plies with the deinfiltrated edge in a stacked relationship, and orienting the deinfiltrated edge of each of the plies in alignment with each other to define a stacked structure; and firing the stacked structure to form a ceramic seal component having a flexible seal edge formed by the plurality of ceramic fibers projecting from a rigid body formed by the matrix infiltrated portion of each of the plies.

2. The process of aspect 1, wherein the deinfiltrating comprises flushing at least a portion of the edge of each of the plies with deinfiltration fluid.

3. The process of any one of aspects 1-2, further comprising removing at least a portion of extraneous fibers from the deinfiltrated edge to further free the ceramic fibers.

4. The process of aspect 3, wherein the removing further comprises freeing the ceramic fibers of the deinfiltrated edge to a predetermined length along the edge.

5. The process of any one of aspects 1-4, further comprising threading the edge with a thread member to define a drape end.

6. The process of any one of aspects 1-5, further comprising applying pressure and heat to the oriented plies in the stacked relationship to form a rigid green body; and deinfiltrating the edge including the plurality of ceramic fibers after the forming of the rigid green body and prior to the firing.

7. The process of any one of aspects 1-6, wherein a layer of the plies stacked includes an uninfiltrated ply adjacent an infiltrated ply.

8. The process of any one of aspects 1-7, wherein the plies include a woven oxide ceramic fiber fabric, the ceramic fibers include oxide ceramic fibers, and the matrix infiltrated portion of each of the plies includes an oxide ceramic matrix.

9. A process of manufacturing a ceramic seal component, comprising: masking an edge of each of a plurality of plies, the edge being defined by a plurality of ceramic fibers extending away from a portion edge of a body portion of each of the plies; infiltrating the body portion of the plurality of plies with the masked edge with a ceramic matrix slurry, the masked edge with the plurality of ceramic fibers defining a less infiltrated portion than the body portion; placing the plurality of plies with the infiltrated body portion and masked edge in a stacked relationship, and orienting the masked edge of each of the plies in alignment with each other to define a stacked structure; and firing the stacked structure to form a seal component having a flexible seal edge formed by the plurality of ceramic fibers projecting from a rigid body formed by the infiltrated body portion of each of the plies.

10. The process of aspect 9, wherein the masking step comprises mechanically masking.

11. The process of aspect 10, wherein the mechanically masking includes inserting the plurality of ceramic fibers extending away from the edge into pores of a mesh screen prior to the infiltrating, and removing the mesh screen from the plurality of ceramic fibers after the applying.

12. The process of any one of aspects 10-11, wherein the mechanically masking includes clamping the plurality of ceramic fibers extending away from the edge within a clamping device prior to the infiltrating, and removing the clamping device from the plurality of ceramic fibers after the applying.

13. The process of any one of aspects 10-12, wherein the mechanically masking includes positioning the edge upright relative to the body portion.

14 The process of any one of aspects 9-13, wherein the masking step comprises chemical masking with a chemical substance configured to withstand conditions from the applying pressure and heat and to burn off during the firing.

15. The process of any one of aspects 9-14, wherein the plies include a woven oxide ceramic fiber fabric, the ceramic fibers include oxide ceramic fibers, and the matrix infiltrated portion of each of the plies includes an oxide ceramic matrix.

16. An engine seal system, comprising: a first section and a second section defining a passage; and a ceramic seal component coupled to the first section and extending between the first section and the second section, the ceramic seal component comprising a structural body portion and an edge seal, wherein the edge seal extends along the second section, the structural body portion comprising a plurality of oxide/oxide woven ceramic fiber stacked plies, the edge seal comprising oxide ceramic fibers extending away from the structural body portion, the edge seal being more flexible and less infiltrated with oxide ceramic matrix slurry than the structural body, wherein at least one of the first section with the ceramic seal component and the second section are movable relative to one another to define an open configuration and a closed configuration of the passage.

17. The system of aspect 16, wherein the plurality of oxide ceramic fibers extends away from an edge of the structural body portion in a unidirectional arrangement.

18. The system of aspect 16, wherein the plurality of oxide ceramic fibers extends away from an edge of the structural body portion in a bidirectional arrangement.

19. The system of aspect 18, wherein the plurality of oxide ceramic fibers having the bidirectional arrangement comprises a first fiber intersecting a second fiber at an angle of up to 90 degrees.

20. The system of any one of aspects 16-19, wherein ends of the plurality of oxide ceramic fibers form a rounded edge.

What is claimed is:

1. A process of manufacturing a ceramic seal component, comprising:
   deinfiltrating an edge of respective preimpregnated plies such that the deinfiltrated edge is defined by a plurality of ceramic fibers extending away from a portion edge of a matrix infiltrated portion of each of the plies, the plurality of ceramic fibers defining a less infiltrated portion than the matrix infiltrated portion;
   placing the plies with the deinfiltrated edge in a stacked relationship, and orienting the edge of each of the plies in alignment with each other to define a stacked structure;
   curing the stacked structure into a rigid green body having a pre-ceramic polymer matrix material structure with the deinfiltrated edge being an exposed free ceramic fiber edge of the rigid green body;
   further deinfiltrating the exposed free ceramic fiber edge of the rigid green body before firing; and
   firing the stacked structure to form a ceramic seal component having a flexible seal edge formed by the plurality of ceramic fibers projecting from a rigid body formed by the matrix infiltrated portion of each of the plies.

2. The process of claim 1, wherein the deinfiltrating comprises flushing at least a portion of the edge of each of the plies with deinfiltration fluid.

3. The process of claim 1, further comprising removing at least a portion of extraneous fibers from the deinfiltrated edge to free the ceramic fibers.

4. The process of claim 3, wherein the removing further comprises freeing the ceramic fibers of the deinfiltrated edge to a predetermined length along the edge.

5. The process of claim 1, further comprising threading the edge with a thread member to define a drape end.

6. The process of claim 1, wherein the plies include a woven oxide ceramic fiber fabric, the ceramic fibers include oxide ceramic fibers, and the matrix infiltrated portion of each of the plies includes an oxide ceramic matrix.

7. The process of manufacturing a ceramic seal component of claim 1, wherein the plurality of ceramic fibers defining a less infiltrated portion than the matrix infiltrated portion are woven to include weft fibers and warp fibers, each of the weft fibers and the warp fibers being unidirectional ceramic fibers; and placing the plies with the deinfiltrated edge in a stacked relationship further comprises orienting the unidirectional ceramic fibers in adjacent plies in the stacked structure at opposite predetermined angles relative to a radial axis of the stacked structure.

8. A process of manufacturing a ceramic seal component, comprising:
   deinfiltrating an edge of respective preimpregnated plies such that the deinfiltrated edge is defined by a plurality of ceramic fibers extending away from a portion edge of a matrix infiltrated portion of each of the preimpregnated plies, the plurality of ceramic fibers defining a less infiltrated portion than the matrix infiltrated portion;
   placing the preimpregnated plies with the deinfiltrated edge in a stacked relationship with an uninfiltrated ply of dry ceramic fabric such that a layer of the stacked structure includes the uninfiltrated ply adjacent an infiltrated ply, and orienting the deinfiltrated edge of each of the preimpregnated plies in alignment with each other and an edge of the uninfiltrated ply to define a stacked structure; and
   firing the stacked structure to form a ceramic seal component having a flexible seal edge formed by the plurality of ceramic fibers projecting from a rigid body formed by the matrix infiltrated portion of each of the preimpregnated plies and the uninfilterated ply.

9. A process of manufacturing a ceramic seal component, comprising:
   deinfiltrating an edge of respective preimpregnated plies such that a plurality of ceramic fibers extend away from a portion edge of a matrix infiltrated portion of each of the preimpregnated plies, the plurality of ceramic fibers defining a less infiltrated portion than the matrix infiltrated portion and woven to include weft fibers and warp fibers, each of the weft fibers and the warp fibers being unidirectional ceramic fibers;
   placing the plies in a stacked relationship by orienting the unidirectional ceramic fibers to define a stacked structure, the unidirectional ceramic fibers in adjacent preimpregnated plies in the stacked structure oriented at opposite predetermined angles relative to a radial axis of the stacked structure; and
   firing the stacked structure to form a ceramic seal component having a flexible seal edge formed by the plurality of ceramic fibers projecting from a rigid body formed by the matrix infiltrated portion of each of the plies.

10. The process of manufacturing a ceramic seal component of claim 9, further comprising
   curing the stacked structure into a rigid green body having a pre-ceramic polymer matrix material structure with the deinfiltrated edge being an exposed free ceramic fiber edge of the rigid green body; and
   further deinfiltrating the exposed free ceramic fiber edge of the rigid green body before firing.

11. The process of manufacturing a ceramic seal component of claim 9, wherein the unidirectional ceramic fibers in adjacent preimpregnated plies in the stacked structure are oriented at opposite predetermined angles of plus and minus forty-five degrees relative to the radial axis of the stacked structure.

* * * * *